(12) United States Patent
Cosentino (10) Patent No.: US 6,282,805 B1
(45) Date of Patent: Sep. 4, 2001

(54) MULTI-CONFIGURABLE MODULAR LEVEL WITH ADJUSTABLE BUBBLE VIAL

(76) Inventor: Bruno A. Cosentino, 38 New St., Eastchester, NY (US) 10709

( * ) Notice: Subject to any disclaimer, the term of this patent is extended or adjusted under 35 U.S.C. 154(b) by 0 days.

(21) Appl. No.: 09/375,863

(22) Filed: Aug. 17, 1999

(51) Int. Cl.$^7$ ...................................................... G01C 9/26
(52) U.S. Cl. ................................................................ 33/374
(58) Field of Search ............................. 33/374, 809, 379, 33/382, 383

(56) References Cited

U.S. PATENT DOCUMENTS

| | | | |
|---|---|---|---|
| 2,551,524 | * | 5/1951 | Bullivant .................................. 33/374 |
| 3,104,477 | * | 9/1963 | Edwill ..................................... 33/374 |
| 4,130,943 | * | 12/1978 | Talbot ..................................... 33/374 |
| 4,152,838 | * | 5/1979 | Cook ....................................... 33/374 |
| 4,928,395 | * | 5/1990 | Good ....................................... 33/374 |
| 5,249,365 | * | 10/1993 | Santiago ................................. 33/374 |
| 5,433,011 | * | 7/1995 | Scarborough et al. ................ 33/374 |
| 6,041,510 | * | 3/2000 | Huff ....................................... 33/374 |
| 6,047,478 | * | 4/2000 | Sowers ................................... 33/374 |

* cited by examiner

*Primary Examiner*—G. Bradley Bennett
(74) *Attorney, Agent, or Firm*—Alix, Yale & Ristas, LLP (57) ABSTRACT

A modular level, which functions as a level for construction trades, comprises a pair of levels which combine to function as one level. The levels also may be separated so that each level may be individually used as a level. An adjustment mechanism calibrates and adjusts the position of the vial relative to the reference edge.

13 Claims, 10 Drawing Sheets

MULTI-CONFIGURABLE MODULAR LEVEL WITH ADJUSTABLE BUBBLE VIAL

FIELD OF THE INVENTION

This invention relates generally to carpenter's or box levels employed in the construction trades for establishing a level (horizontal) reference line, or a plumb (vertical) reference line.

BACKGROUND OF THE INVENTION

In the construction trades the need often arises to establish a reference line which is level or a reference line which is plumb and to this end various devices have been developed for establishing such reference lines. One of the most common devices for establishing a reference line is the carpenter's level.

The carpenter's level has at least one reference edge and one or more bubble vials for correctly aligning the reference edge along a true horizontal or vertical line. Carpenter's levels are commonly available in various lengths ranging from about eight inches up to about forty-eight inches. While levels in the common range of lengths are suitable for most tasks, the need often arises for a level of extended length, such as a level of over forty-eight inches in length. Levels of extended length are not widely available and those which are available tend to be expensive on account of their unusual size. In addition, levels of extended length are unwieldy due to their size and present problems in transport and storage.

It is well-known that even though the carpenter's level is a valuable and oftentimes costly tool, it is subject to the vicissitudes of use. Bumping and jarring in the course of everyday handling can cause the bubble vials of the level to become misaligned with respect of the reference edge, thereby degrading the accuracy of the level and ultimately its usefulness.

In view of the need for a level of extended length and versatility and the drawbacks associated with such levels as are presently known in the art and the need for maintaining the accuracy of such a level, the inventor has developed the present invention.

SUMMARY OF THE INVENTION

A level thus equipped may be used individually when a level of short length is needed, or two or more levels may be coupled together when a level of extended length is needed for a particular job. In addition, the invention comprises a bubble level for establishing a horizontal level line or a vertical plumb line which is adjustable relative to the reference edge of the level in order to calibrate the level.

In a first aspect of the invention, the level comprises a frame having longitudinally spaced-apart end portions with at least one reference edge extending from a first spaced-apart end portion to the second spaced-apart end portion. The level also comprises at least one level indicator means. The indicator means may be a bubble vial, an electronic level device or other means for establishing a horizontally level line or a vertically plumb line. The ends of the level are adapted for releasable coupling with one another, so that two or more levels so equipped may be joined together to form a level of extended length. The levels may also be joined to form a square.

In another aspect of the invention the carpenter's level includes one or more bubble vials for determining the orientation of the reference edge. A bubble vial of the invention may be adjusted by an adjustment assembly relative to a reference edge of the level to thereby calibrate the level. The adjustment assembly preferably incorporates a pinion gear to achieve the proper vial reference edge relationship.

The invention accordingly comprises the several elements of the invention and the relation of one or more such elements in respect to each of the others, and the article possessing the features, properties, and relation of elements exemplified in the following detailed disclosure.

An object of the invention is to provide a modular level assembly which is highly versatile.

Another object of the invention is to provide a modular level assembly for use in the construction trades which comprises a releasable coupling means disposed at the longitudinal ends of the level for the coupling together of two or more such levels thereby forming a level assembly of extended length.

A further object of the invention is to provide a level having one or more bubble vials for determining orientation of the level, wherein the level vials are adjustable to provide for the calibration and improvement in accuracy of the level.

A yet further object of the invention is to provide a new and improved modular level assembly which is selectively configurable to form a carpenter's square.

Other objects and advantages of the invention will become apparent from the specification and the drawings.

DETAILED DESCRIPTION OF THE PREFERRED EMBODIMENTS

Figure 1:
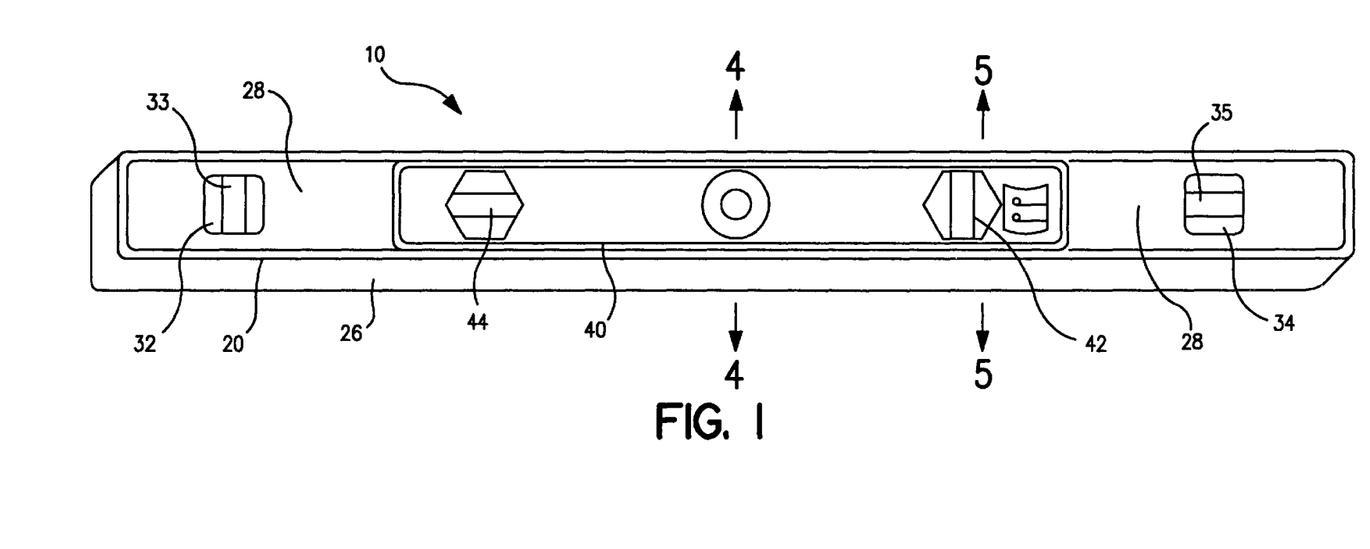
FIG. 1 is a perspective view of a modular level in accordance with the present invention.

With reference to the drawings, wherein like numerals represent like parts throughout the figures, a modular level in accordance with the present invention is generally designated by the numeral 10. The modular level is a composite construction which comprises a master level 20 and an auxiliary level 40 which are nested in a module so that the modular level 10 can essentially function as a single level or be separated to function as the two separate levels 20, 40. The levels 10, and 40 may have a box-type structure or numerous other configurations.

Figure 2:
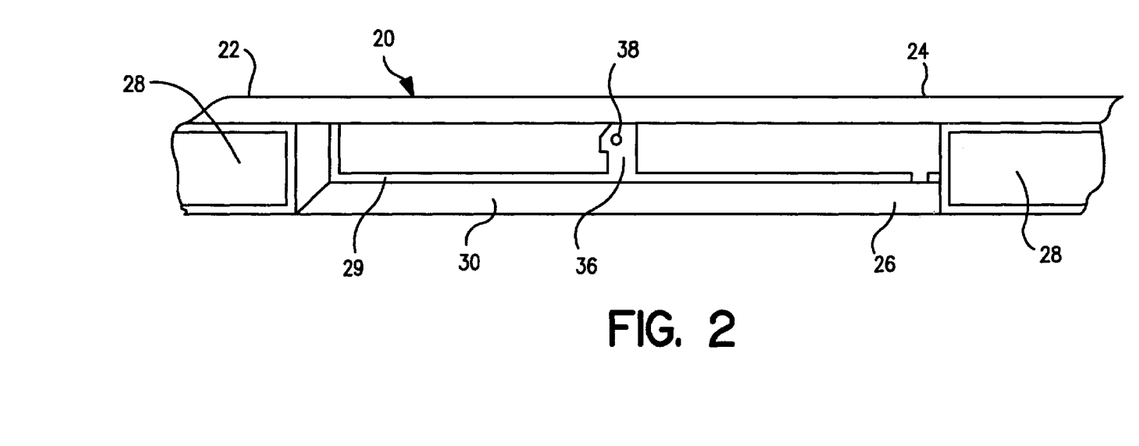
FIG. 2 is a fragmentary perspective view of a master level component of the modular level of FIG. 1.

The master level 20 comprises an elongated frame 22, which may be constructed of metal, plastic or other suitable materials. The master level 20 functions as a standard construction level with the frame 22 providing the principal structure. The frame 22 is symmetric about a longitudinal axis disposed between a pair of parallel linear reference edges 24, 26. The frame, which may have a generally rail-type construction, defines a central channel-like receptacle 30 which receives the auxiliary level 40, which may be, for example, a two foot level. The receptacle 30 may be open at the front and rear portion thereof and forms a retaining shoulder 29 for capturing the auxiliary level 40.

The opposing end portions of the frame include panels 28 which define channels, slots or fixed structures for slidably receiving or mounting opposed level vials or vial/window units 32, 34. Each level vial unit 32, 34 preferably comprises an elongated transparent tube 33, 35 which is filled with a liquid which forms a bubble to indicate a given level or non-level orientation.

The proper angular orientation of the vial/vial units 32, 34 relative to the reference edges 24, 26 is important for functioning of the level. The frame may include or receive panels 28 or other structures which define, for example, a polygonal opening commensurate with a complementary polygonal shape of the fixture for the vial unit. A stud/notch structure or other suitable indexing means (neither illustrated) may also be employed on the frame and vial unit to properly position the vial tube 33, 35.

In one embodiment, one of the vial units 32 is a plumb (vertical or perpendicular to the reference edge) vial, and the other vial unit 34 is a horizontal (parallel to the reference edge) vial. It is generally preferred that both of the vials are equidistantly spaced from the longitudinal center of the level. Additional horizontal or plumb vials may also be provided.

Figure 6:
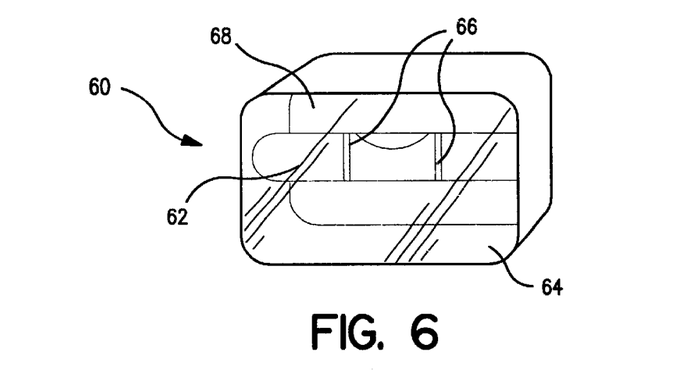
FIG. 6 is a frontal perspective view illustrating a representative level vial unit which may be employed in the modular level.

With reference to FIG. 6, for a representative level vial unit 60, which may be employed in place of level vial unit 32 or 34, the tube 62 is mounted to a fixture 64 which mounts the vial to the frame. The fixture 64 may assume a wide variety of configurations. The tube is etched or inscribed with lines 66 which indicate the "level" position of the bubble. A transparent glass or plastic window 68 may also be mounted to the fixture. In some embodiments, transparent level vials without additional windows are employed. Unless otherwise indicated, level vial units 32, 34 refer to both vial and vial/window units.

Figure 3:
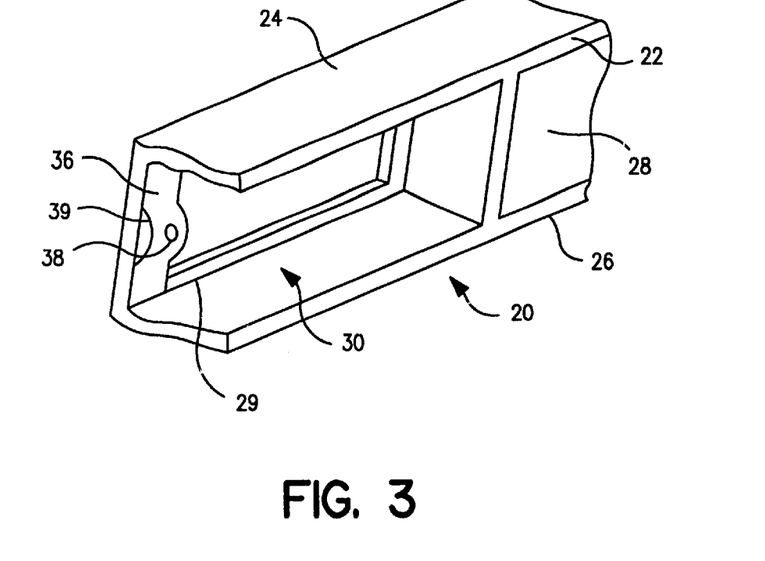
FIG. 3 is an enlarged fragmentary perspective view of a portion of the master level of FIG. 2.
Figure 4:
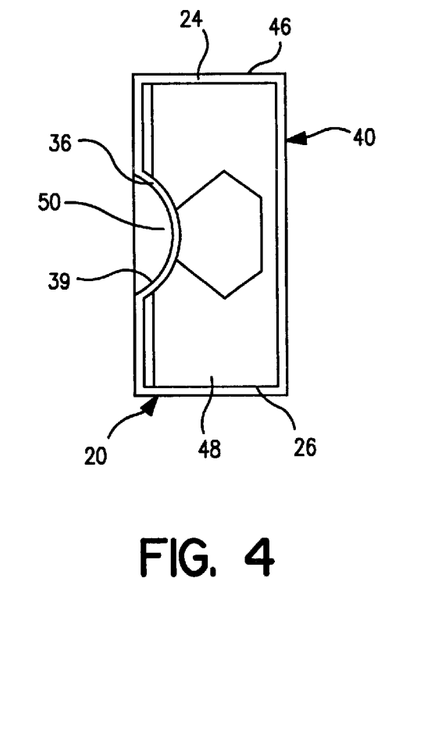
FIG. 4 is an enlarged sectional view of the modular level of FIG. 1, taken along the line 4—4 thereof.
Figure 5:
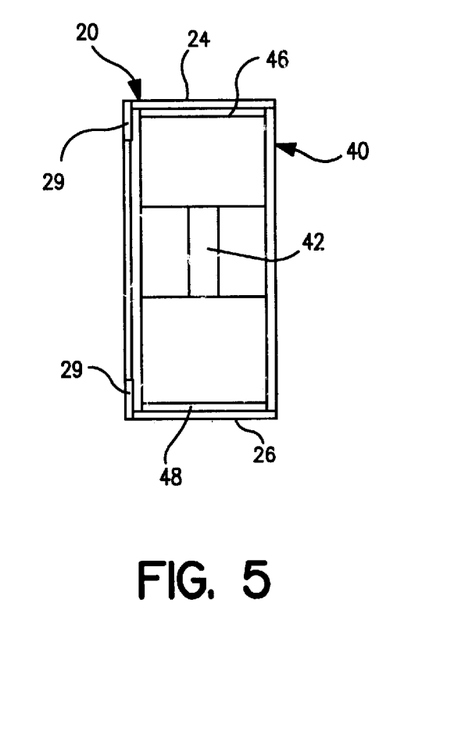
FIG. 5 is an enlarged sectional view of the modular level of FIG. 1, taken along the line 5—5 thereof.

With reference to FIGS. 2–4, the frame comprises a medial plate 36 having a threaded opening 38 which receives a screw bolt 50. The bolt extends through a central opening in the auxiliary level and captures the auxiliary level at a central location thereof. The bolt 50 is preferably retained with the auxiliary level 40. The screw bolt 50 is capable of free rotation and is threadably receivable in the plate for securing the auxiliary level 40 in a captured properly aligned position against shoulder 29. The medial plate 36 may have a convex bow 39 adjacent the threaded opening 38 to accommodate the end of the bolt so that it does not project beyond the rear face of the master level.

Figure 7:
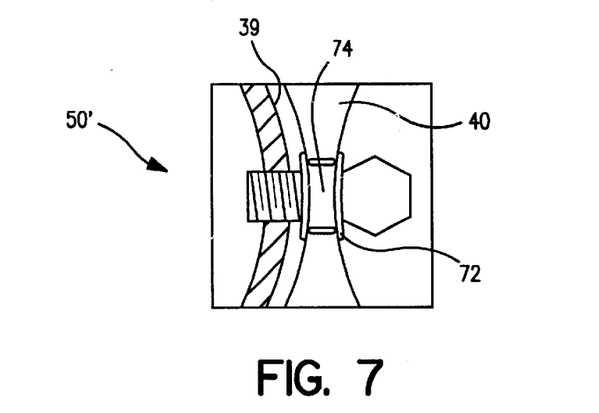
FIG. 7 is an enlarged sectional view illustrating an alternative embodiment of the modular level.
Figure 8:
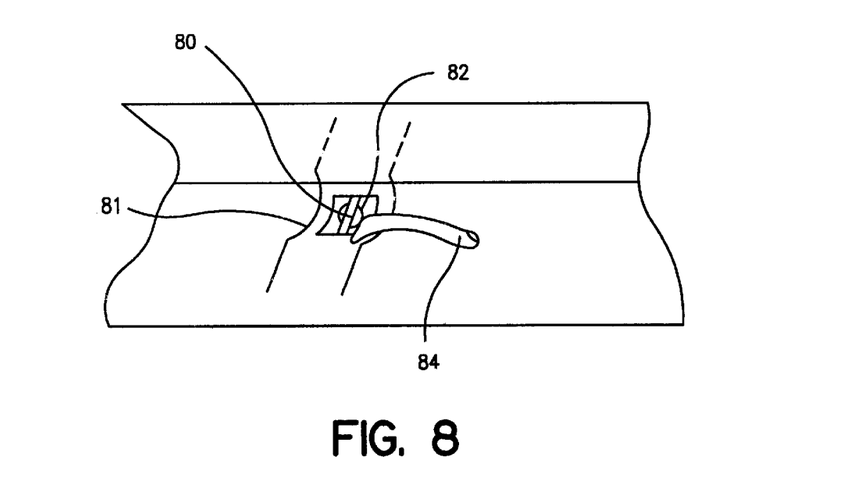
FIG. 8 is a fragmentary perspective view illustrating another embodiment of the modular level.
Figure 9:
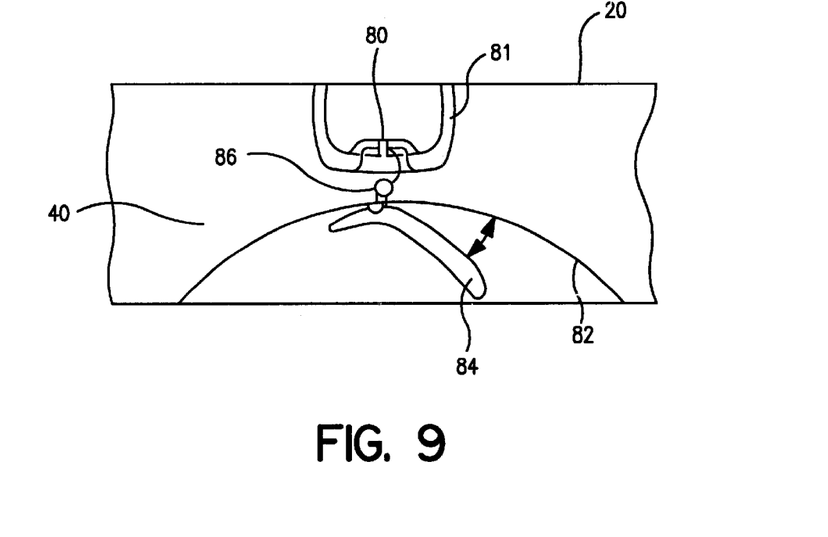
FIG. 9 is a fragmentary sectional view of the level of FIG. 8.

With reference to FIG. 7, the screw bolt 50' may be retained to the auxiliary level by means of a bifurcated collar 72 which retains a washer 74. The washer 74 permits free rotation of the bolt 50' relative to the auxiliary level. Alternatively, as illustrated in FIGS. 8 and 9, the auxiliary level 40 may be retained to the master level 20 by a latch bar 80 fixed to a bracket 81 of the master level. The bar 80 receives a hook-type latch 82 controlled by a pivotal handle 84. The latch 82 pivots about a post 86 (partially illustrated) fixed to the auxiliary level. The direction of handle movement is illustrated by the FIG. 9 arrows. The handle may also be mounted in a recess of the auxiliary level. Naturally, other alternative means for retaining the auxiliary level to the master level may also be employed.

The rear portion of the auxiliary level 40 is preferably configured to be complementary with the frontal surfaces of the retainer structure of the master level 20 as illustrated in FIG. 9. The conforming shapes of the master level 20 and auxiliary level 40 also strengthen the level assembly and ensure linear integrity of the reference edges 24, 26.

In one embodiment, as illustrated, the auxiliary level 40 comprises a plumb vial unit 42 and a horizontal level vial unit 44 at opposing end locations thereof. Additional horizontal or plumb vials may also be provided. Vial units 42, 44 may also be configured similar to vial unit 60. The auxiliary level has a pair of parallel linear reference edges 46, 48. The auxiliary level is configured so that upon reception, the reference edges 46, 48 are parallel to the corresponding reference edges 24, 26 of master level 20. The exterior dimensions are configured for close reception in the channel or receptacle 30 of the frame so that the central screw bolt 50 aligns with the threaded opening 38 of the plate 36 and readily allows for a threaded reception therein as well as subsequent withdrawal.

Alternatively, the auxiliary level may include two horizontal level vials or two plumb level vials or both level and plumb vials at opposite longitudinal positions of the level. It should be appreciated that the vial units 32, 34 and 42, 44 are preferably respectively equidistantly spaced from the center of the frame for both the master level and the auxiliary level.

Figure 10:
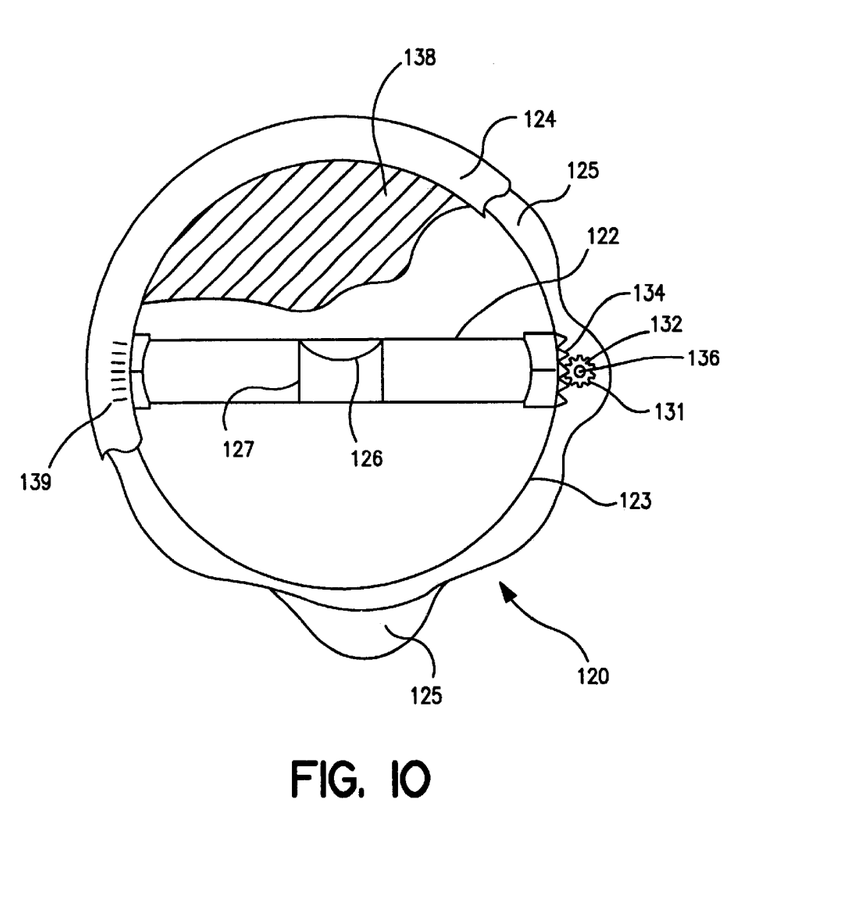
FIG. 10 is a fragmentary side view, partly in section and portions removed, of the adjustable bubble vial of the present invention and portions of the modular level.
Figure 17:
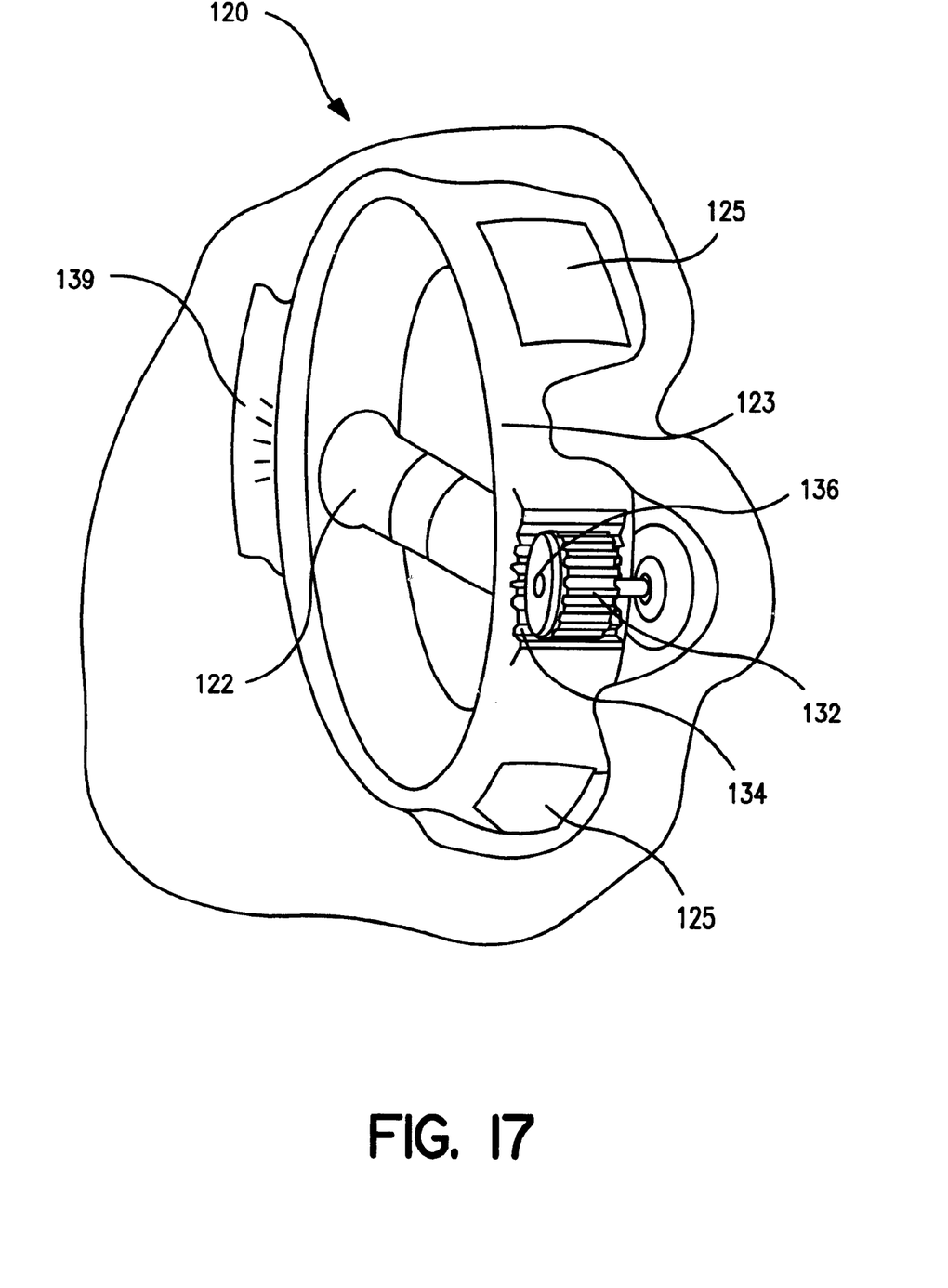
FIG. 17 is a fragmentary perspective view, portions broken away, of the adjustable bubble vial of FIG. 10 and surrounding portions of the modular level.

With reference to FIGS. 10 and 17, a bubble vial which may be employed with the levels of the present invention may assume the form of an adjustable vial unit 120 which has an adjustment mechanism for maintaining the vial 122 in accurate parallel relationship with the linear reference edge of the level. The adjustment mechanism includes a rotatable pinion 132 for angularly adjusting the alignment of the vial for calibration purposes.

The vial unit 120 has a cylindrical wall or inner frame 123 which interiorly supports the vial. The inner frame 123 is closely received in a cylindrical cavity or frame opening of the level. A plurality of angularly spaced tabs 125 protrude radially from the wall. The tabs are captured by an annular cover 124 which forms an arcuate slot. The tabs 125 are closely received in the slots to allow for limited angular rotation of the vial unit. Adjacent one end of the wall, a tooth gear surface 134 having a radius of curvature, which is the center of the vial unit, meshes with the pinion 132. The pinion 132 is mounted to the frame of the level. The pinion is preferably covered by cover 124 except for a small access opening (not illustrated).

It will be appreciated that the level may be calibrated by incrementally rotating the pinion 132 which may be accessed through the access opening through the face of the modular level. The pinion 132 has a central socket or slot 136. The pinion is rotated by torquing an Allen wrench, small screwdriver or other suitable tool which engages slot 136. The opposing end of the level vial cover is affixed with a calibration scale 139 having a plurality of calibration marks which are alignable with a reference mark on the vial unit to aid in the calibration process. The vial unit 120 is mounted in the frame or to the panels of the modular level in such a fashion that ordinarily the position of the level is tightly fixed and can only be angularly repositioned by means of the pinion 132 which requires significant and purposeful torque to implement the adjustment.

In use, the modular level 10 may be employed as a single level so that all of the vials of both of the levels 20, 40 can be employed. Alternatively, the auxiliary level 40 can be removed from the frame by loosening bolt 50, and both the auxiliary level 40 and the master level 20 can be used separately. In one embodiment, the master level 20 is four foot in length and the auxiliary level 40 is two foot in length.

Figure 11:
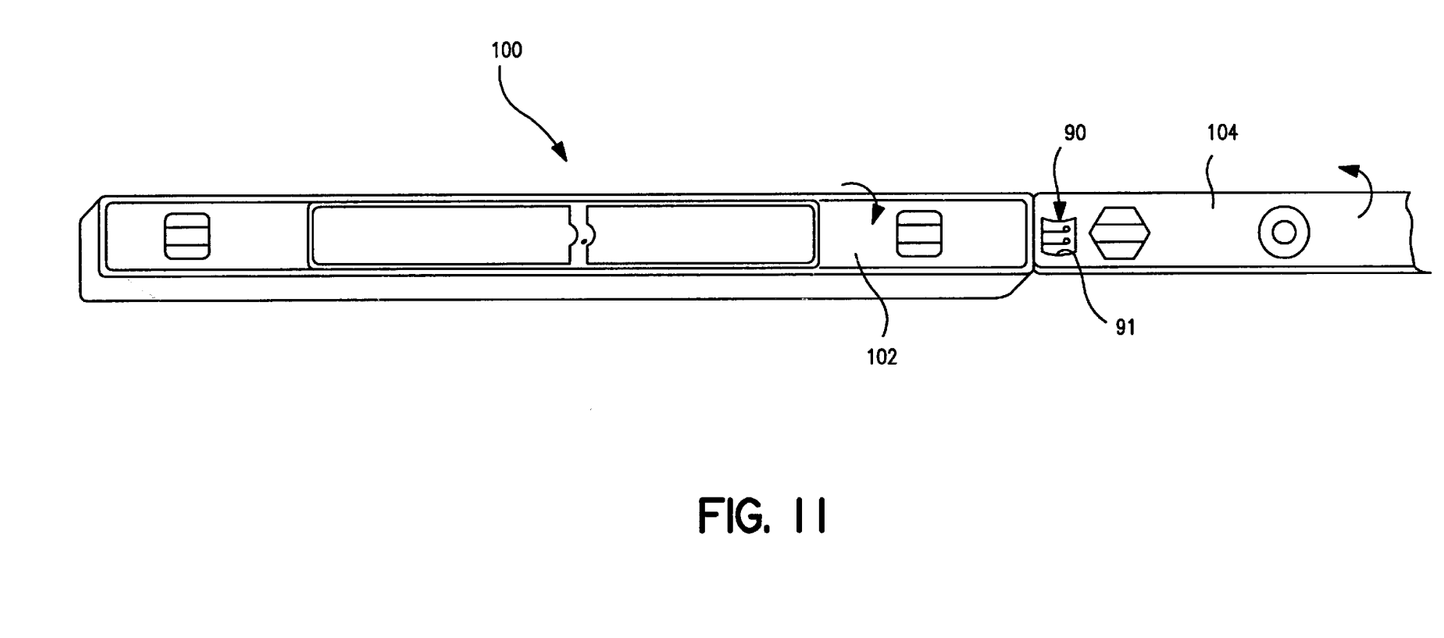
FIG. 11 is a side view, partly in schematic, illustrating the end-to-end coupling of two levels, one partially illustrated, in accordance with the present invention.

With reference to FIG. 11, a modular level in accordance with the present invention is generally designated by the numeral 100. Modular level 100 incorporates a coupling mechanism 90 (see also FIGS. 12 and 13) which permits two levels 102 and 104 to be joined in end-to-end fashion as illustrated. Except for the modifications described below, levels 102 and 104 may be similar in form and function to levels 20 and 40, respectively.

Figure 12:
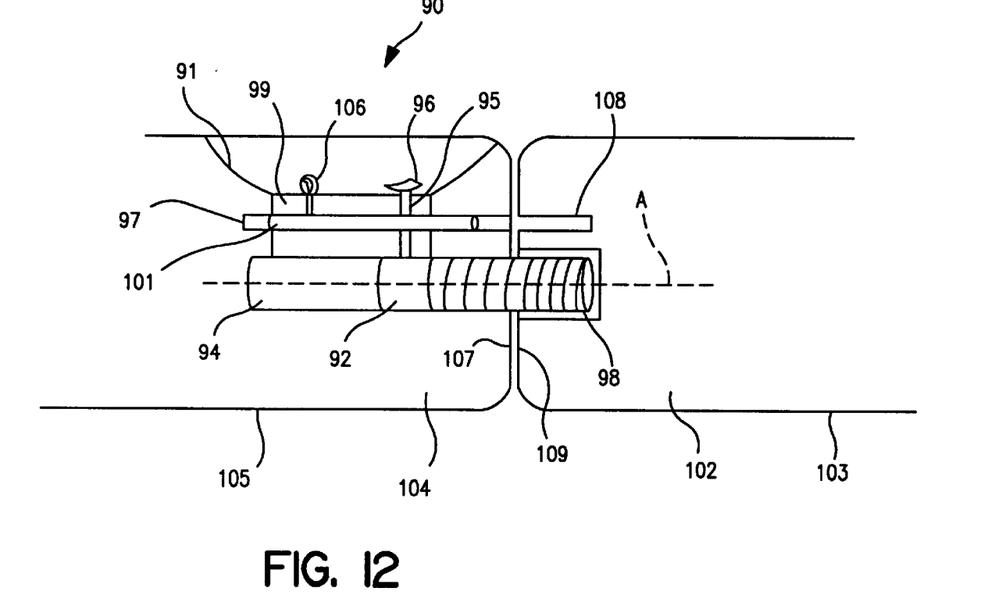
FIG. 12 is an enlarged fragmentary side sectional view of the levels of FIG. 11 illustrating the end-to-end coupling of the two levels.
Figure 13:
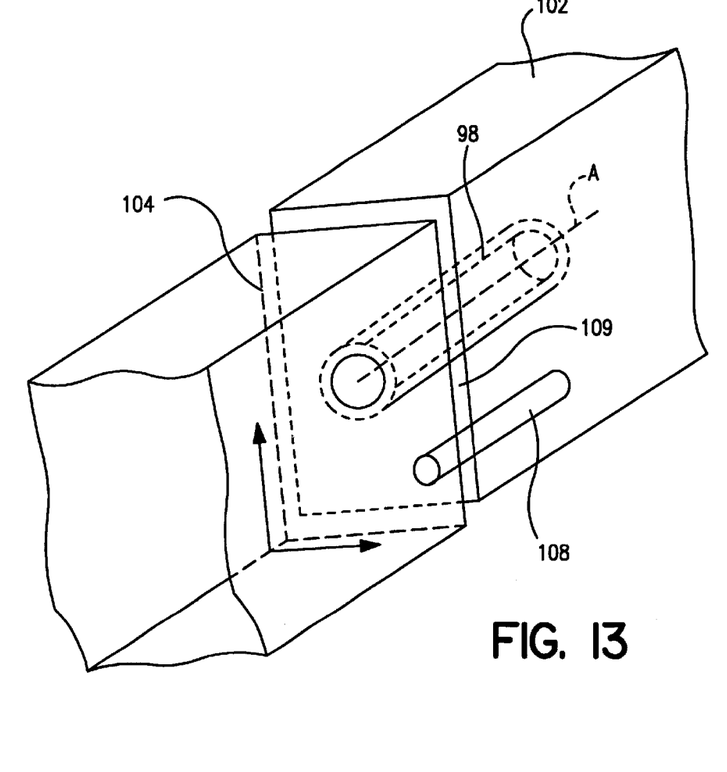
FIG. 13 is a fragmentary perspective view, partly in phantom and partly in schematic, illustrating the coupling portion of the level configuration of FIG. 11.

With reference to FIGS. 12 and 13, the coupling mechanism 90 for releasably joining a master level 102 and an auxiliary level 104 for providing a level of extended length is shown. The coupling mechanism 90 includes, in a longitudinal outer end of the auxiliary level 104, a bolt 92 adapted for threadable engagement with a threaded receiver 98 fixed in a longitudinal end of the master level 102. The bolt 92 is adapted for selectable retractable longitudinal movement thereby permitting the bolt to be retracted within the end of the level 104 or extended from the bolt from the end of the level 104, as desired. A bolt cavity 94 is provided in the level to accommodate the bolt 92 when in the retracted position and to provide a precise guide for the bolt 92 when it is extended. The bolt cavity 94 generally extends along the longitudinal axis of the level and opens through the exterior of the bolt-end of the level.

The relationship between the bolt 92 and the receiver 98 is critical. The central axis A through the bolt and the central longitudinal axis through the receiver are coaxial upon coupling so that reference edges 103 and 105 of the master and auxiliary levels precisely align. In this regard, the end surfaces 107, 109 of the auxiliary and master levels abut in a substantially surface-to-surface or adjacent parallel relationship so that a reference edge continuum defined by reference edges 103 and 105 is provided along one side of the coupled master level and the auxiliary level. It will, of course, be appreciated that the dimensions of the master and auxiliary levels are such that the auxiliary level does not form a coplanar relationship at all faces with the master level when they are disposed in end-to-end relationship. The bolt cavity has sufficient length to permit the bolt 92 to be fully retracted with the bolt cavity 94.

Associated with the retractable bolt in a recess 91 of a face or panel of level 102 is a laterally extending position selector 95 for manual selected movement of the bolt 92 from, for example, a retracted to an extended position. A button 96 associated with the position selector 95 provides a convenient and comfortable surface for finger or thumb engagement to facilitate selectively moving the position selector. A first guide slot 97 is formed in the level accommodating sliding horizontal movement of the position selector 95 and associated bolt 92. The second level features a bolt receiver 98 for retaining the bolt 92 and is adapted for threadable engagement of the bolt 92.

Alternatively, the bolt 92 may be retained in either the lock or retained position by a spring loaded detent arrangement (not illustrated) or by other well-known mechanisms.

The two levels 102 and 104 are connected in end-to-end relationship by projecting the bolt 92 and aligning the bolt with the receiver 98 to threadably engage the bolt with the receiver by torquing either the master level and/or the auxiliary level as illustrated by the arrows in FIG. 11. After the end surfaces have been brought into substantially end-to-end relationship and the reference edges 103 and 105 have been properly aligned, a lock pin 101 is slid by means of a button 106 into a corresponding slot 108 at the end of the master level. This facilitates not only the locking of the two levels but implementing the precise alignment required to obtain the precise composite colinear reference edges when the levels are coupled. The lock pin 101 is laterally offset from the bolt 92, and the button 106 is also located in recess 91.

Figure 14A:
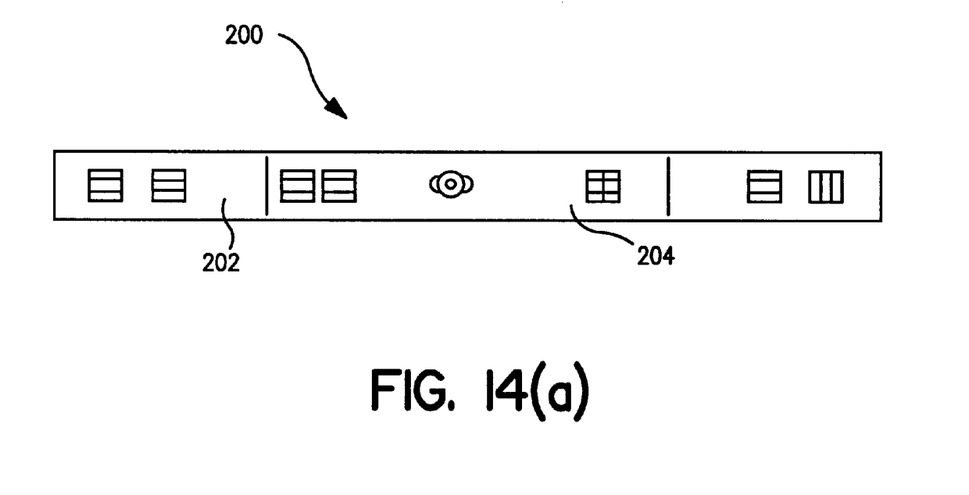
FIG. 14(a) is a schematic view illustrating a modular level configuration in a combined configuration.
Figure 14B:
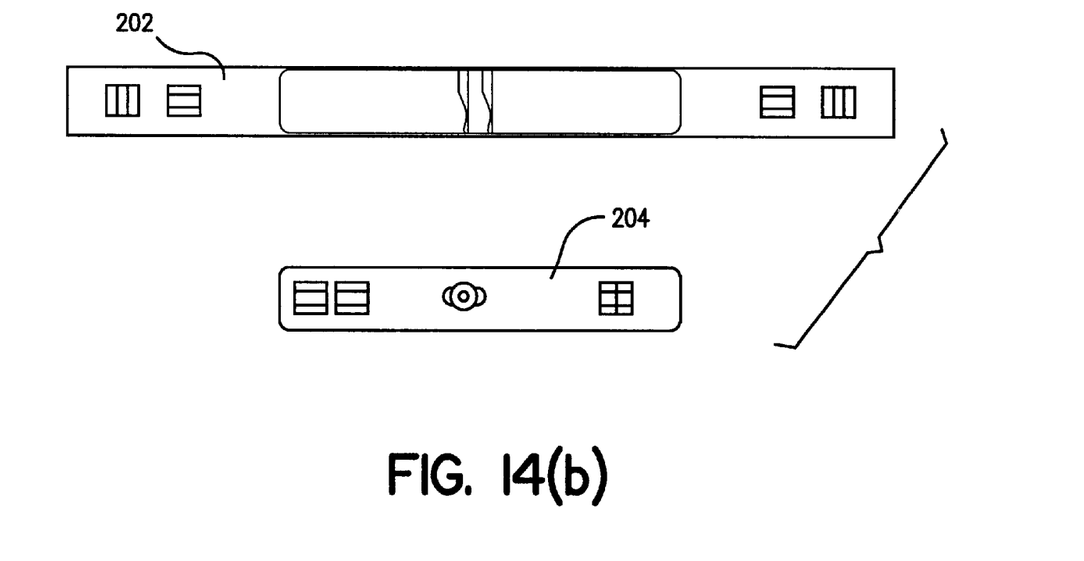
FIG. 14(b) is a schematic view illustrating a modular level in a separated configuration.
Figure 14C:
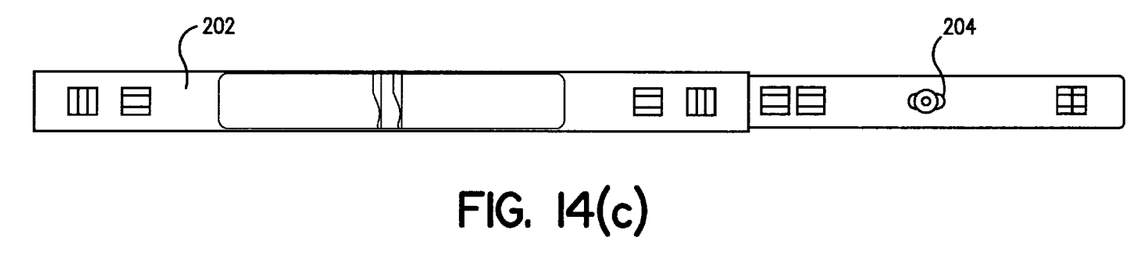
FIG. 14(c) is a schematic view illustrating the modular level assembled in an extended configuration.
Figure 14D:
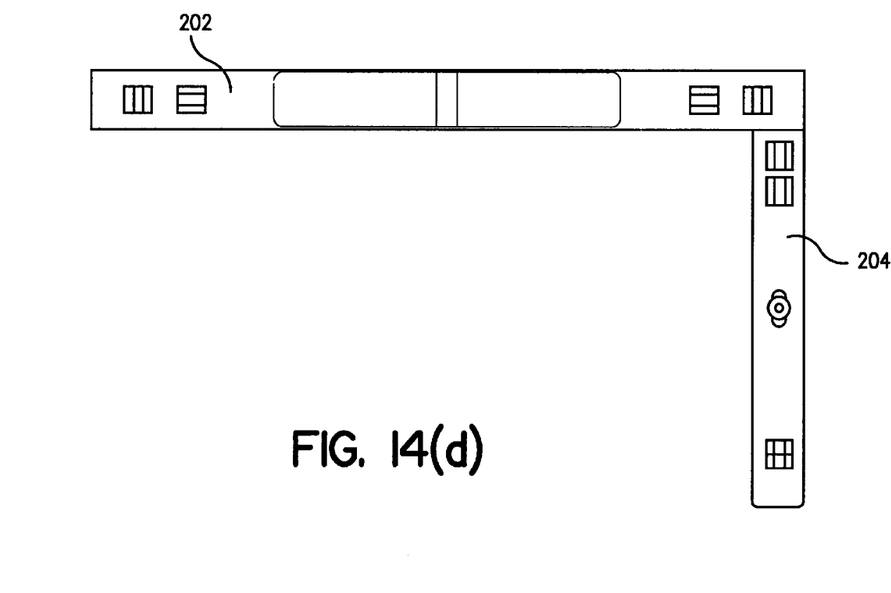
FIG. 14(d) is a schematic view illustrating the modular level assembled in a square configuration.

With reference to FIGS. 14(a)–(d), the inventions may also be implemented in connection with reversing the coupling relationship between the master level 202 and auxiliary level 204 and providing a receiver and a lock slot at both the end of the master level as well as the reference edge thereof. (The corresponding receivers are designated by 98' and 98" and the corresponding lock slots are designated by 108' and 108".) In this fashion, a multi-configurable capability is provided for the modular level unit 200. For example, FIG. 14(a) schematically represents the configuration for modular level assembly 200 wherein the auxiliary level 204 is received within the master level 202 to form a single level. FIG. 14(b) represents the separated configuration for levels 202 and 204. FIG. 14(c) schematically represents a single extended level when the levels 202 and 204 are coupled in end-to-end relationship, and FIG. 14(d) shows that the master level 202 and auxiliary level 204 can be coupled together to form a square.

Figure 15:
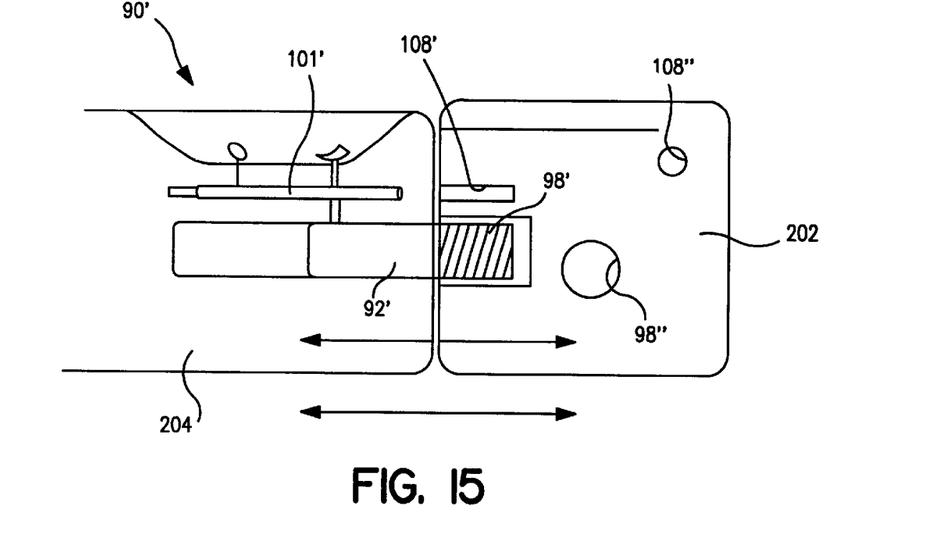
FIG. 15 is a fragmentary end view, partly broken away and partly in schematic, illustrating the square configuration of FIG. 14(d)
Figure 16:
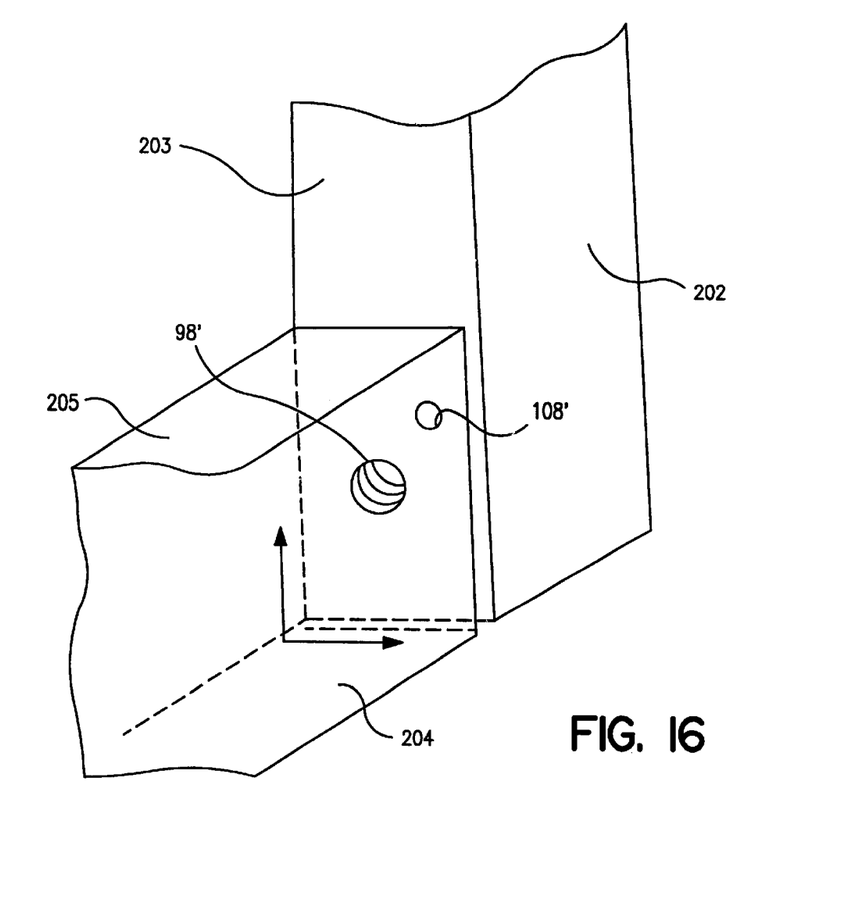
FIG. 16 is a fragmentary perspective view of the square configuration of FIG. 14(d) illustrating the connecting relationship.

With reference to FIGS. 15 and 16, the coupling assembly 90' which is similar in form and function to coupling assembly 90 is incorporated into the modular level unit 200. The master level 202 is illustrated wherein it has receivers 98' and 98" with axes which are essentially orthogonal. In addition, the lock slots 108' and 108" are formed in orthogonal faces of the master level. In this fashion, the coupling connection is made both in an end-to-end relationship as well as an orthogonal relationship which provides for the carpenter's square configuration wherein reference edges 203 and 205 are perpendicular. The receiver/lock bolt relationship between the master level and auxiliary level may be reversed for either the end-to-end or orthogonal coupling.

It will be appreciated that a single level can be equipped at one end with the bolt and the other end and adjacent panel with a bolt receiver. When a length extended level or a carpenter's square is required, a second similarly equipped level can be coupled with the first level by simply coupling the levels together at the appropriate ends. This is accomplished by threading the bolt a first level to the bolt receiver of a second level and rotating one or the other level to obtain secure threaded coupling of the levels. It will further be appreciated that the first and second levels that are coupled together in this manner can be substantially identical levels, levels of different lengths, master levels, auxiliary levels or combinations thereof. The levels may employ various level indicators, such as liquid bubble vials of various forms, electronic indicators or other indicating devices.

While preferred embodiments of the foregoing invention have been set forth for purposes of illustration, the foregoing description should not be deemed a limitation of the invention herein. Accordingly, various modifications, adaptations and alternatives may occur to one skilled in the art without departing from the spirit and the scope of the present invention.

What is claimed is:

1. A modular level for use in construction trades and the like comprising:
    a master level having opposed longitudinally spaced ends and a linear reference edge extending between said ends and defining a central receptacle and having at least one level indicator positioned at a location spaced from said receptacle;
    an auxiliary level receivable in said receptacle and having opposed longitudinally spaced ends, a linear reference edge extending between said ends and at least one level indicator, said opposed ends and linear reference edge being fully receivable in said receptacle;
    retainer means for releasably retaining said auxiliary level to said master level; and
    coupling means for releasably coupling said master frame and auxiliary level and end-to-end relationship so that said master frame linear reference edge is collinear with said auxiliary level linear reference edge.

2. The modular level of claim 1 wherein said coupling means further comprises a threaded bolt which is projectable through one of said ends of said master level or said auxiliary level and a threaded receiver which is accessible through one end of said other master level or auxiliary level, said bolt being threadably engageable with said receiver.

3. The modular level of claim 2 further comprising a locking means for locking said coupling means.

4. The modular level of claim 3 wherein said locking means comprises a lock member which is projectable through one end of said master level or auxiliary level and is receivable in a lock slot extending through one end of said other master level or auxiliary level.

5. The modular level of claim 2 wherein said threaded bolt is slidably receivable in a bore and further comprising a button for displacing said bolt and which is accessible through a face of said master level, said face orthogonal to said end through which said bolt projects.

6. The modular level of claim 1 further comprising a second coupling means for releasably coupling said master frame and auxiliary level so that said master level linear reference edge is perpendicular to said auxiliary level linear reference edge.

7. The modular level of claim 6 wherein said master level comprises a pair of threaded receivers having generally orthogonal axes and said auxiliary level houses a threaded bolt which is projectable through said end for engagement with either of said receivers.

8. A modular level system for use in construction trades and the like comprising:
    a first level having opposed longitudinally spaced ends, a linear reference edge extending between said ends and at least one level indicator;
    a second level having opposed longitudinally spaced ends, a linear reference edge extending between said ends and at least one level indicator; and
    coupling means on said first and second levels for releasably coupling said first level and second level in at least one of a linear relationship and perpendicular relationship, so that in said linear relationship said first level reference edge is collinear with said second level reference edge and in said perpendicular relationship said first level linear reference edge is perpendicular to said second level linear reference edge, said coupling means comprising a threaded bolt which is projectable through one of said first level and a threaded receiver which is accessible through an end of said second level, said bolt being threadably engageable with said receiver.

9. The modular level system of claim 8 further comprising a locking means on said first and second levels for locking said coupling means.

10. The modular level system of claim 9 wherein said locking means comprises a lock pin which is projectable through an end of said first level and is receivable in a slot through an end of said second level.

11. The modular level system of claim 8 wherein said bolt is retractable in a position fully enclosed by said first level.

12. The modular level of system of claim 8 wherein said coupling means couples said first level and second level in both said linear relationship and said perpendicular relationship.

13. The modular level system of claim 8 wherein said coupling means couples said first level and second level in both said linear relationship and said perpendicular relationship.

* * * * *